United States Patent [19]

Anthony

[11] 4,219,353
[45] Aug. 26, 1980

[54] METHOD OF OPERATING A LEAD BLAST FURNACE

[75] Inventor: Theodore W. Anthony, Baton Rouge, La.

[73] Assignee: Schuylkill Metals Corporation, Baton Rouge, La.

[21] Appl. No.: 15,063

[22] Filed: Feb. 26, 1979

Related U.S. Application Data

[63] Continuation of Ser. No. 829,909, Sep. 1, 1977, abandoned.

[51] Int. Cl.² .............................................. C22B 13/02
[52] U.S. Cl. .......................................... 75/77; 266/47
[58] Field of Search ............... 75/77; 266/81, 83, 186, 266/47

[56] References Cited

U.S. PATENT DOCUMENTS

| | | | |
|---|---|---|---|
| 1,362,570 | 12/1920 | Hamilton | 75/77 X |
| 2,973,194 | 2/1961 | Bryan et al. | 266/83 X |

Primary Examiner—M. J. Andrews
Attorney, Agent, or Firm—Kane, Dalsimer, Kane, Sullivan and Kurucz

[57] ABSTRACT

The disclosure is of a new and improved blast furnace for smelting lead ores and lead bearing residues. In brief, the improvement comprises inclusion of a means for controlling the flow of air/oxygen to the tuyeres so that at all times there is an even distribution of air/oxygen to all areas of the furnace smelting zone.

1 Claim, 3 Drawing Figures

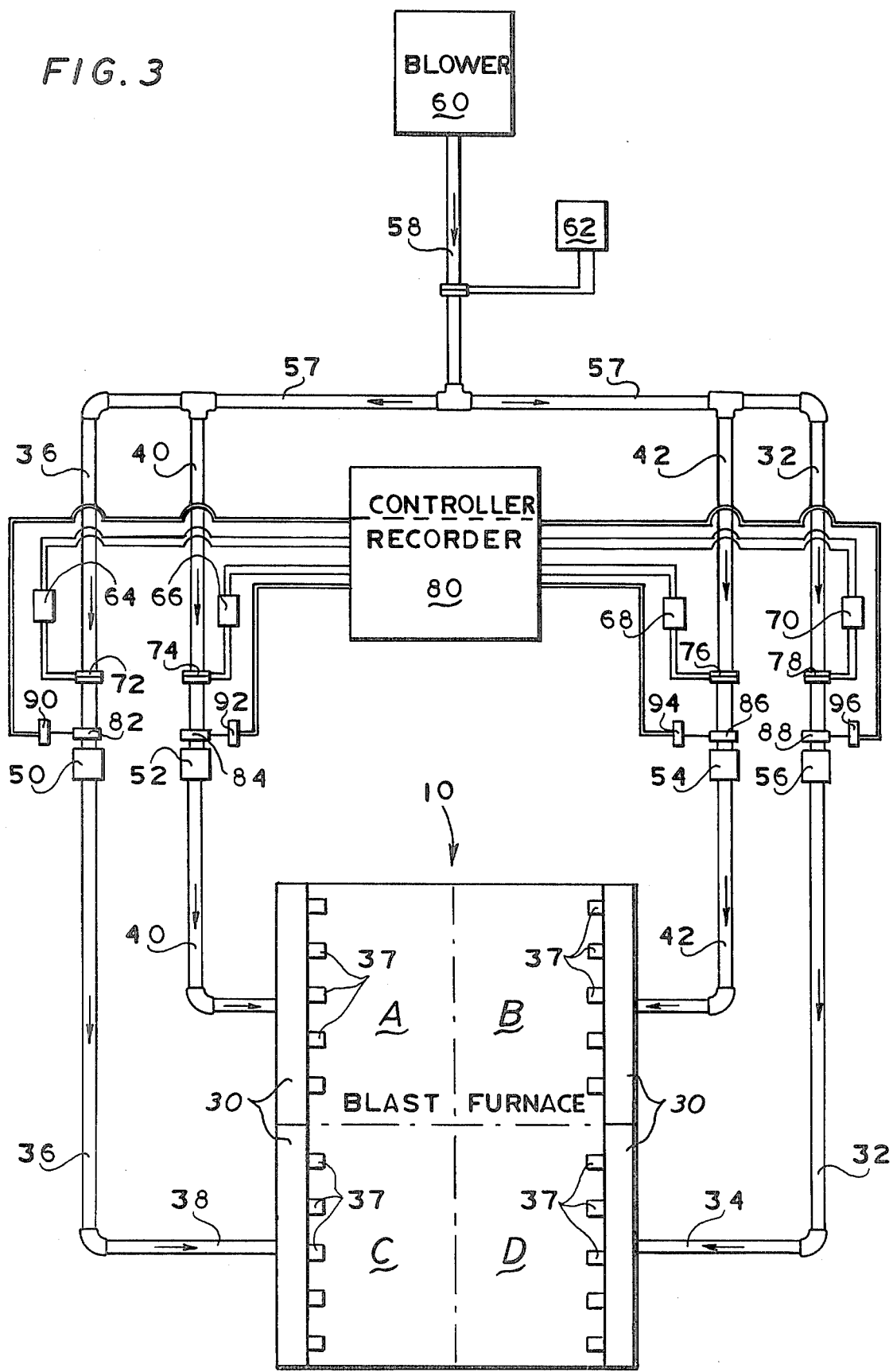

METHOD OF OPERATING A LEAD BLAST FURNACE

This is a continuation of application Ser. No. 829,909 filed Sept. 1, 1977, now abandoned.

BACKGROUND OF THE INVENTION

1. Field of the Invention

The invention relates to furnaces for smelting and refining metals and more particularly relates to blast furnaces for smelting lead ores and lead bearing residues.

2. Brief Description of the Prior Art

Prior hereto, blast furnaces have included tuyeres for distribution of oxygen and oxygen containing gases such as air to the furnace smelting zone. During the course of furnace operation, the tuyeres generally become slagged over (blocked) at least partially. Other conditions existing in the tuyeres and/or conduits delivering oxygen to the tuyeres may reduce the flow rates of oxygen to certain tuyeres while not affecting other tuyeres. This imbalance of air/oxygen flow to different zones of the lead crucible may result in irregular smelting of the ore compositions, with consequent uneven charge descent. So called "blow holes" are created in a furnace charge when an unusually high volume of air/oxygen passes through a concentrated area of charge, blowing excessive amounts of charge out of the furnace. In addition, uneven distribution of air/oxygen over the smelting zone results in an unpredicatable and uncontrollable location of said zone (a factor in creating blow holes and slagging the tuyeres), resulting in loss of slag composition control, excessive volatilization of lead and partially smelted accretions building up on the shaft of the vertical blast furnace. These problems in the prior art furnaces are well documented; see for example Metallurgy of Lead and Zinc, AIME, 121, (1936), pgs. 65, 98 and 105. Corrective measures generally require shut-down of the furnace to remove slag, accretion build-up etc. It is appreciated by those skilled in the art that such shut-downs are costly in terms of lost production time, efficiency of the overall smelting operation and maintenance costs.

The improved lead blast furnace of the present invention obviates the above described problems associated with the prior art furnaces, thereby increasing the tonnage of lead bullion produced by 10 to 15 percent over prior art furnaces of comparable capacity.

SUMMARY OF THE INVENTION

The invention comprises a lead blast furnace, which comprises;

a crucible;

a water-jacketed column defining a shaft over said crucible;

means of providing cooling water to said column;

tuyeres, evenly spaced and mounted through the walls of said column, a distance of from about 1 to 3 feet above the bottom of said crucible;

means of carrying oxygen to said tuyeres for release above said crucible and into the smelting zone;

adjustable valve means connected to said means for carrying, said valve means adjustably regulating the rate of flow of air/oxygen to said tuyeres;

means associated with said means of conveying, for sensing the rate of flow of oxygen therein; and means for adjusting said valve means in response to changes in the rate of oxygen flow sensed by said means for sensing.

BRIEF DESCRIPTION OF THE DRAWINGS

FIG. 3 is a schematic view of the oxygen flow control component of the embodiment furnace of FIG. 1.

DETAILED DESCRIPTION OF THE PREFERRED EMBODIMENTS OF THE INVENTION

Figure 1:
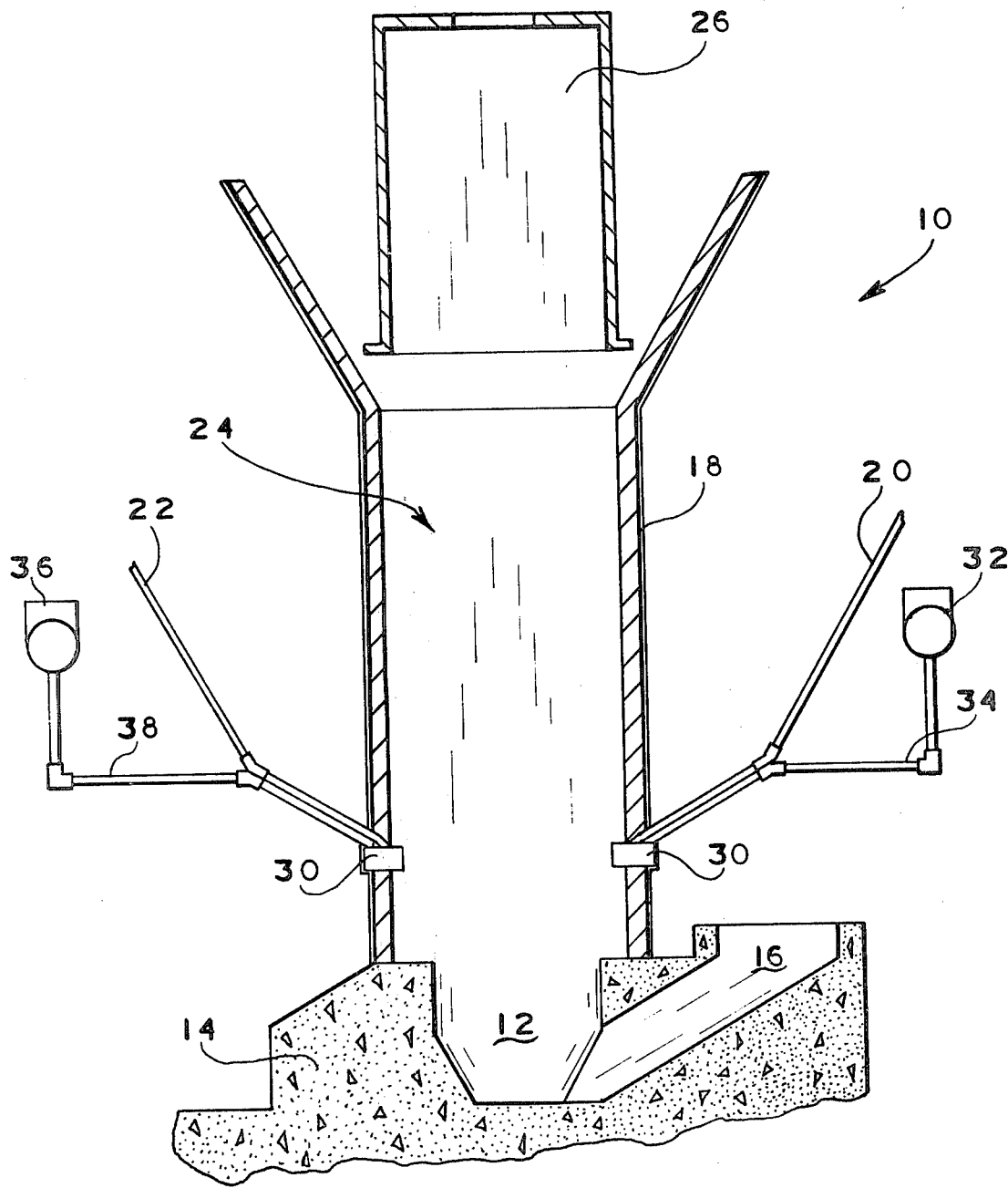
FIG. 1 is a cross-sectional side elevation of an embodiment furnace of the invention.

FIG. 1 is a cross-sectional side elevation of a preferred embodiment lead blast furnace 10 of the invention. Furnace 10 includes conventional components including a crucible 12 set in an insulative foundation 14. A lead well 16 provides for access to lead bullion, the product of smelting lead ore and/or lead compositions. A vertical shaft 24 over the crucible 12 is defined by a water-jacketed column 18 which is water-cooled by coolant water introduced through conduit 20 and discharged through conduit 22. A take-off 26 for flue gas is mounted over the shaft 24. Mounted in the column 18, on the sides thereof and approximately 1 to 3 feet about the bottom of the crucible 12 are tuyeres 30. The tuyeres 30 are arranged on two sides of the furnace 10 as can be seen more clearly in FIG. 3. Continuing to refer to FIG. 1, it may be seen that the tuyeres 30 on the right side of furnace 10 receive oxygen or oxygen containing gases through conduit 34 from bustle pipe 32 while the left hand tuyeres 30 are fed by conduit 38 from bustle pipe 36.

Figure 2:
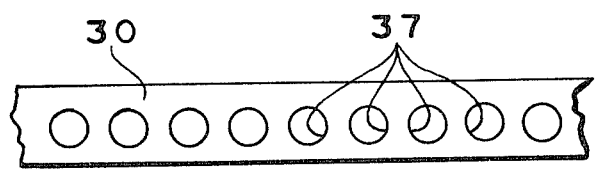
FIG. 2 is a view in perspective of a section of the tuyeres in the embodiment furnace of FIG. 1.

FIG. 2 is a side elevation of a part or section of tuyeres 30 and shows that they are evenly spaced openings defined by openings 37. Generally blast air at 8–50 oz./in.$^2$ gauge pressure is admitted through the tuyeres 30 at a rate of from 1,500–2,500 cfm to aid combustion and complete the formation of metallic oxides which are then reduced to metal by the coke and carbon monoxide present in the shaft 24 charge.

FIG. 3 is a schematic view of the oxygen flow control component employed in the preferred furnace 10 of the invention. As shown in FIG. 3, furnace 10 may be divided in 4 quadrants A, B, C and D. Each quadrant receives air/oxygen from a separate section of tuyeres 30. The quadrant C receives oxygen flow from conduit 38 fed by bustle pipe 36. Quadrant D receives from conduit 34 fed by bustle pipe 32. Quadrants A and B receive oxygen distributions from bustle pipes 40 and 42, respectively. The bustle pipes 34, 36, 40 and 42 receive air/oxygen flow from a header pipe 57 fed by conduit 58 connected to blower 60. The initial flow of air/oxygen through the pipes and conduits to tuyeres 30 as is shown by the arrows is regulated by air weight controller 62.

The heart of the furnace 10 of the invention resides in a means associated with the above described pipes, headers and conduits 32, 34, 36, 38, 40, 42, 57 and 58, for sensing the rate of gas flow to each quadrant A, B, C and D of the furnace 10 and adjusting that ratio of flow as necessary to assure that the distribution of air/oxygen to any given quadrant is uniformly equal to the rate of flow to the remaining quadrants, resulting in equal air/oxygen distribution to each quadrant A, B, C and D. In the embodiment of FIG. 3, this means is provided as follows. Each bustle pipe 32, 36, 40 and 42 leading to the quadrants D, C, A and B respectively, is fitted with a check valve 56, 50, 52 and 54 respectively. Upstream of the check valves in each pipe 32, 36, 40 and 42 there is positioned an orifice 78, 72, 74 and 76, respectively, each orifice being connected to a flowmeter 70, 64, 66 and 68, respectively, which senses the rate of flow of gas in the respective bustle pipe 32, 36, 40 and 42. The flow rate sensor in the flowmeters transmit a direct current milliampere input signal to controller/recorder 80. Controller/recorder 80 includes a current-to-air transducer for converting the input signal to a proportional pneumatic output signal. The pneumatic output signal is transmitted by controller/recorder 80 to adjust automatic valves 82, 84, 86 and 88 through the associated and corresponding diaphragm actuators 90, 92, 94 and 96. The automatic valves and their associated actuators are installed, one in each of the bustle pipes 32, 36, 40 and 42 so that the rate of flow in each bustle pipe, to the tuyeres 30 may be automatically regulated according to the changes in flow sensed by the flowmeters 64, 66, 68 and 70.

The furnace 10 is operated in conventional manner, charging the shaft 24 with sinter, fluxes, coke and lead bearing ores and compositions. Cooling water is circulated from water line 20, through the water-jacketed column 18 and out of water line 22. Blast air at 8-50 oz./in.$^2$ gauge pressure is delivered to the header 57 and bustle pipes 32, 36, 40 and 42 by blower 60. The flow rate in the bustle pipes 32, 36, 40 and 42 is sensed by the flowmeters 64, 66, 68 and 70 and reported to the controller/recorder 80. Under ideal (constant) conditions all of the control valves 82, 84, 86 and 88 will be in the same position, therefore admitting substantially the same quantity of air (oxygen) to the quadrants A, B, C and D of the furnace 10. However, during continued operation events generally dictate that one or more sets of tuyeres experience an impedance in flow rate as described previously. The cause may be for example a porosity change occurring within the charge surrounding the particular set of tuyeres or any other perturbance hindering the entrance of air/oxygen to the quadrants A, B, C or D of the furnace 10. Then, the flowmeter 64, 66, 68 or 70 associated with the impeded bustle pipe, sensing the impedance to air flow causes a signal impulse to be transmitted to the controller/recorder 80 which in turn modulates the appropriate control valve 82, 84, 86 or 88 to admit more air/oxygen to the tuyeres affected by the impedance. "More" air or oxygen means bringing the flow rate up to the level of flow traveling through the unimpeded bustle pipes. Conversely when one or more sets of tuyeres 30 experiences relatively less resistance to gas flow, the same sequence of events will occur with the exception that the control valve regulating the affected bustle pipe will be modulated to admit less air/oxygen to the associated tuyeres 30. In this manner, there is an equal distribution of air/oxygen to each of the furnace 10 quadrants A, B, C and D at all times. Automatic adjustments to compensate for developing impedances to flow rates assure this.

Those skilled in the art will appreciate that there will be instances when an unequal distribution of air/oxygen to the quadrants A, B, C and D may be desired. This may be accomplished by programming the controller/recorder 80 to feed a higher or lower flow rate of air/oxygen to any particular set of tuyeres. The system will then maintain the prescribed conditions. In addition, at any time the controller/recorder 80 may be disengaged and the valves 82, 84, 86 and 88 operated manually.

Those skilled in the art will also appreciate that many modifications may be made to the above described apparatus without departing from the spirit and the scope of the invention. For example, a wide variety of automatic valves are available for use as components of the apparatus, see for example the Foxboro control valve, Foxboro Company, Bulletin GS4-6A1-A (October 1972). The controller/recorder 80 need not have a recording function although that is preferred to maintain a record of the air distribution history for a given smelt. Controller/recorders 80 are conventional instruments; see for example the units provided by Foxboro Company and identified as (1) Controller. Model #130M-N4 or (2) Recorder Model #124 FE. In addition, more or less than 4 zones or quadrants and the associated individual tuyere sections may be employed in the lead blast furnace of the invention.

What is claimed:

1. A process for smelting lead ores and lead bearing residues, which comprises;
   (a) providing a lead blast furnace, which comprises;
   a crucible;
   a water-jacketed column defining a shaft over said crucible;
   means of providing cooling water to said column;
   a plurality of tuyeres, evenly spaced and mounted through the walls of said column, above the bottom of said crucible;
   a plurality of pipe means each for carrying oxygen to each of the plurality of said tuyeres for release above said crucible and into the smelting zone of the blast furnace;
   an adjustable valve means connected to each of said pipe means for carrying, said valve means adjustably regulating the rate of flow of oxygen to each of said tuyeres;
   means associated with said pipe means for sensing the rate of flow of oxygen therein; and
   controller means connected to the means for sensing and adapted to open the valve associated with one of said pipe means when the means for sensing senses an impedance in the one pipe means to bring the oxygen flow rate in the one pipe means up to the level of flow travelling through the remaining, unimpeded pipe means and also adapted to close the valve associated with one of said pipe means when the means for sensing senses less resistance to gas flow in the one pipe means to bring the oxygen flow rate in the one pipe means down to the level of flow travelling through the remaining, higher resistant flow pipe means in response to changes in the rate of oxygen flow sensed by said means for sensing; the flow in the remaining pipe means being maintained at a constant predetermined rate;
   (b) charging the shaft with sinter, fluxes, coke and a lead bearing composition;
   (c) circulating cooling water through the water-jacketed column;
   (d) heating the charge;
   (e) delivering oxygen to the tuyeres through the pipe means; and
   (f) maintaining by operation of the controller means, a predetermined level of flow of oxygen through the pipe means.

* * * * *